(12) United States Patent
Kuo et al.

(10) Patent No.: US 7,573,482 B2
(45) Date of Patent: Aug. 11, 2009

(54) METHOD FOR REDUCING MEMORY CONSUMPTION WHEN CARRYING OUT EDGE ENHANCEMENT IN MULTIPLE BEAM PIXEL APPARATUS

(75) Inventors: Wen-Ning Kuo, Taipei (TW); Che-Hung Hu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 380 days.

(21) Appl. No.: 11/304,824

(22) Filed: Dec. 16, 2005

(65) Prior Publication Data

US 2007/0139717 A1  Jun. 21, 2007

(51) Int. Cl.
*G06T 1/60* (2006.01)
*G09G 5/36* (2006.01)
*G09G 5/00* (2006.01)
*H04N 5/222* (2006.01)
*G06T 5/00* (2006.01)
*G06K 9/40* (2006.01)

(52) U.S. Cl. .................. 345/530; 345/560; 345/204; 348/333.12; 358/3.27; 358/530; 382/254; 382/266

(58) Field of Classification Search .................. 345/530, 345/557–561, 204; 348/333.12, E9.042; 358/3.27, 448, 530, 532; 382/254, 266–275

See application file for complete search history.

(56) References Cited

U.S. PATENT DOCUMENTS

| 5,029,108 | A | 7/1991 | Lung |
| 2005/0055592 | A1* | 3/2005 | Velasco et al. ............. 713/322 |
| 2007/0081205 | A1* | 4/2007 | Tai et al. ..................... 358/515 |

* cited by examiner

*Primary Examiner*—Xiao M Wu
*Assistant Examiner*—Tize Ma
(74) *Attorney, Agent, or Firm*—Birch, Stewart, Kolasch & Birch, LLP

(57) ABSTRACT

A method for reducing memory consumption when carrying out edge enhancement in a multiple beam pixel apparatus is provided, wherein Static Random Access Memories and first in first out buffers are employed. When the first to the $n^{th}$ input units read the next bit data, the first rows of the bit data in the first to the $n^{th}$ buffers are removed, and each row of bit data behind the first rows is moved towards left by one bit. The first rows of bit data in the $(n+1)^{th}$ to the $(n+4)^{th}$ buffers are stored in one end of the first to the fourth memories respectively, and a bit data is taken out from the other end of each of the memories, to be sequentially stored in the end of the first to the fourth buffers, and the read next bit data is stored in the fifth to the $(n+4)^{th}$ buffers.

10 Claims, 19 Drawing Sheets

METHOD FOR REDUCING MEMORY CONSUMPTION WHEN CARRYING OUT EDGE ENHANCEMENT IN MULTIPLE BEAM PIXEL APPARATUS

BACKGROUND OF THE INVENTION

1. Field of Invention

The present invention relates to a method for reducing memory consumption when carrying out Edge Enhancement in a multiple beam pixel apparatus. More particularly, the present invention relates to a method for reducing the consumption of hardware resources when carrying out multiple groups of Edge Enhancement operations.

2. Related Art

Recently, in the field of image processing, the key point of most research and development is to improve the visual effect of an image output apparatus (e.g. a printer) such that the visual effect generated after image output matches with the real subject. The edge of the original image object, e.g., texts, curves, three-dimensional objects, etc., can be approximated by the linear equation or natural logarithm, etc., to be more smooth. When these objects are digitally processed, they are required to be converted into a matrix form which is processable for an image output apparatus, and their edges are required to match the grids of the apparatus.

However, if the resolution of the image output apparatus is relatively low, the edge of the image object is found to be step-shaped of one grid by another grid through the naked eye, and a smooth edge as that of the original image object cannot be obtained. Therefore, various solutions are proposed to reduce the jagged effect on the edge of the image object, such that the image output by the image output apparatus can match with the real subject.

As for Edge Enhancement Method and Apparatus for Dot Matrix Devices disclosed in U.S. Pat. No. 5,029,108, the dotting state of the pixels of an image edge and that of the surrounding pixels are compared with a plurality of predetermined pictures, to determine which predetermined picture the pixels of the image edge match with, thus it is determined how to dot the pixels at the image edge to smooth the output image edge and to allow the image more accurately match with the original one. The enhancement of central pixels of each predetermined picture will be modified differently according to the dotting state of the surrounded pixels, for example, dotting at ¼ to the left of the central pixel, dotting at ⅔ to the right of the central pixels, etc.

Referring to FIG. 1, it is a structural schematic view of a conventional one beam Edge Enhancement Technology (EET) application. The serial data is read sequentially by an input unit 140 with the unit of one bit, and then after being processed by a one beam EET 10, the image is output to a display screen through a laser diode (LD) and a spinner, or printed by a printer, such that the edge of the output image is relatively smooth, without jagged edges.

Referring to FIG. 2, it is a schematic view of the operation of the conventional one beam EET 10. The serial data is stored in the fifth buffer of a first in first out (FIFO) buffer 120 after being read by an input unit 140, and a 9×5 table 110 can be taken out from the serial data in the FIFO buffer 120 through registering by a Static Random Access Memory (SRAM) 170. And the central pixel 130 of the table is detected to be a To Be Adjusted Pixel (TBAP) or not, and if it is, the TBAP is adjusted through the one beam EET 10.

Referring to FIG. 3, it is a structural schematic view of a conventional two-beam engine application. The serial data in FIG. 3 should be divided into odd column of serial data read by the first input unit 141, and even column of serial data read by the second input unit 142 sequentially, thus double speed can be achieved compared with the original one beam engine output. If the one beam EET 10 is further employed individually, the edge smoothness of the output image can be improved. Especially, since the EET carried out for the TBAP is at a slow speed, the output speed will be significantly improved, if double output speed is achieved.

However, in the Edge Enhancement operation, the serial data must be read in sequence, therefore the first input unit 141 and the second input unit 142 cannot be accessed at random. Instead, they must read the respective data to be processed respectively, thus a double sized FIFO buffer 120 and a SRAM 170 are required. This is equivalent to repeatedly reading data twice from the external, result in a mass consumption of the memory capacity used for operation in the internal of the system, especially the bandwidth used by the internal signal transmission bus, and the Central Processing Unit (CPU) resources consumed when transmitting data. No matter the Edge Enhancement is carried out to odd column of serial data or to even column of serial data, the data must be read repeatedly for many times to construct an individual 9×5 table 110. As a result, other processing procedures are significantly influenced. Although the printing speed is increased and output effects are improved, relative larger hardware costs are required, especially in the consumption of memory and CPU resources.

SUMMARY OF THE INVENTION

In view of the above problems, the object of the present invention is to provide a method for reducing memory consumption when carrying out Edge Enhancement in a multiple beam pixel apparatus, wherein when reading the serial data, the serial data are sequentially moved in FIFO buffer and Static Random Access Memory (SRAM), and n 9×5 tables can be taken out from the first in first out (FIFO) buffer to act as the tables required for Edge Enhancement Technology (EET) operation.

Accordingly, in order to achieve the above objects, the method for reducing memory consumption when carrying out Edge Enhancement in a multiple beam pixel apparatus disclosed in the present invention comprises the following steps:

Firstly, the first column of serial data is read by the first input unit, and the second column of serial data is read by the second input unit, and similarly, the $n^{th}$ column of serial data is read by the $n^{th}$ input unit. The first 9 rows of data of the first buffer to the $(n+4)^{th}$ buffer are filled according to the order of each column of serial data, and the serial data in the first 4 columns without being stored in the buffer are temporarily stored in the SRAM.

Meanwhile, in the (n+4) buffers, n 9×5 tables are taken out sequentially for detecting the central pixel of the individual table to be a To Be Adjusted Pixel (TBAP) or not.

If it is a TBAP, the Edge Enhancement operation is carried out at the 9×5 table with the TBAP as the central pixel to generate an adjusted central pixel value.

Then, the n central pixel values, being or without being adjusted, are output.

When the first input unit to the $n^{th}$ input unit continue to read the next bit data, the first rows of bit data of the first buffer to the $n^{th}$ buffer are removed, and the first rows of bit data of the $(n+1)^{th}$ buffer to the $(n+4)^{th}$ buffer are stored in one end of the first memory to the fourth memory respectively. Each row of bit data behind the first row of the FIFO buffer is moved towards left by one bit, and one bit data is taken out from the other ends of each of the four RAMs, and it is sequentially stored in the row at the end of the first buffer to the fourth buffer, and the next bit data read by the first input unit to the $n^{th}$ input unit are stored in the fifth buffer to the $(n+4)^{th}$ buffer.

And finally, the central pixel value of each 9×5 table is detected and adjusted according to the above steps, until there is no next bit data to be input.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only for, and thus are not limitative of the present invention, and wherein.

DETAILED DESCRIPTION OF THE INVENTION

A method for reducing memory consumption when carrying out Edge Enhancement in a multiple beam pixel apparatus is disclosed. In the following detailed descriptions of the present invention, various specific details will be provided to completely illustrate the present invention. However, it will be appreciated by those skilled in the art, the present invention can be implemented without using the specific details, or be implemented with alternative elements or methods. In other cases, the known methods, procedures, parts, and circuits will not be described in great detail, to avoid undesirably confusing the key point of the present invention.

Figure 1:
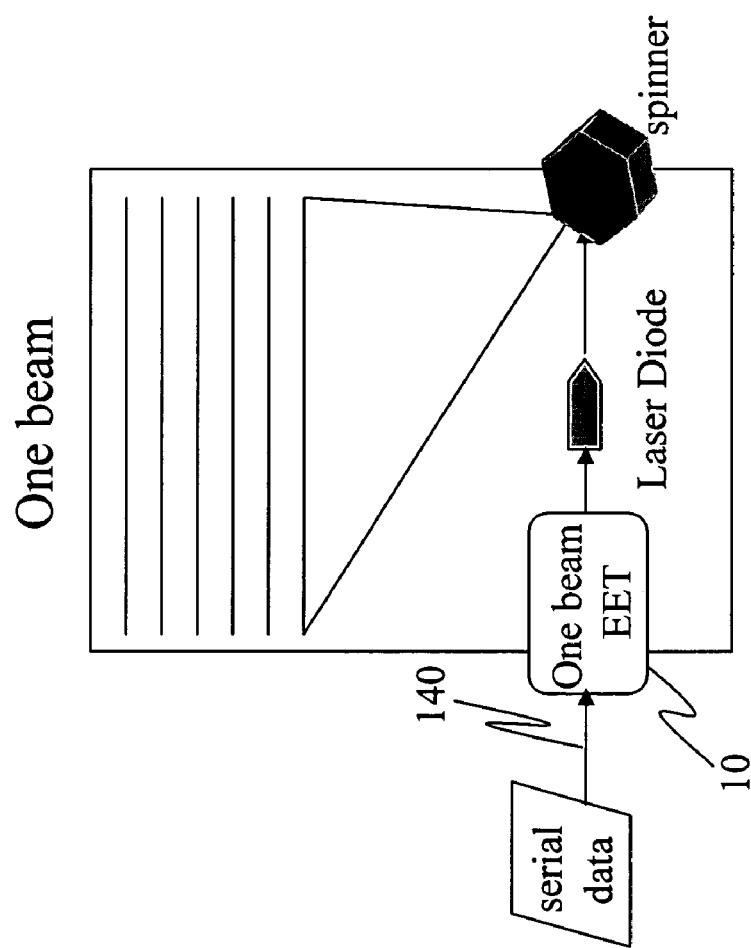
FIG. 1 is a structural schematic view of a conventional one beam Edge Enhancement Technology (EET) application.
Figure 2:
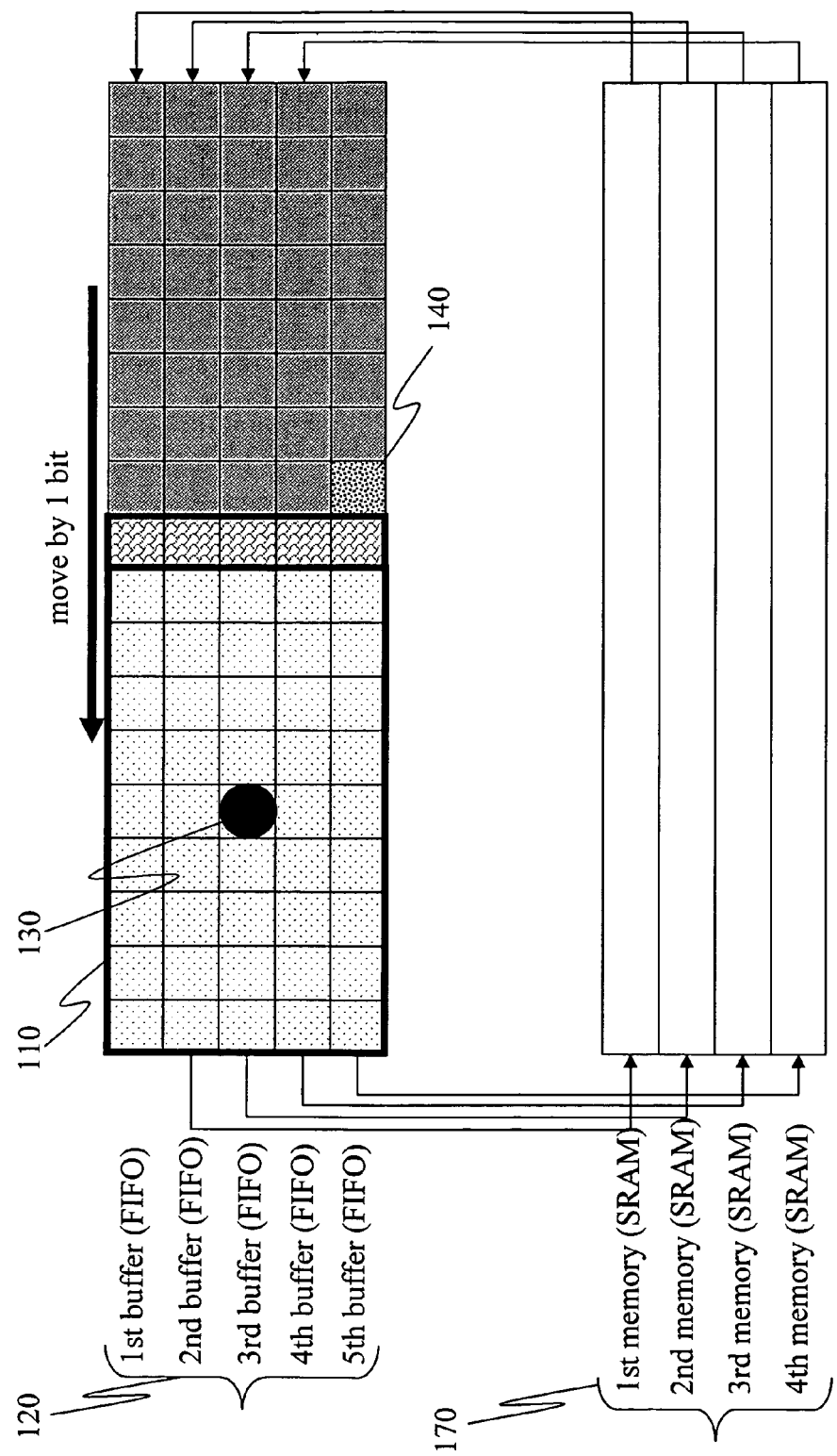
FIG. 2 is an operational schematic view of the conventional one beam EET.
Figure 3:
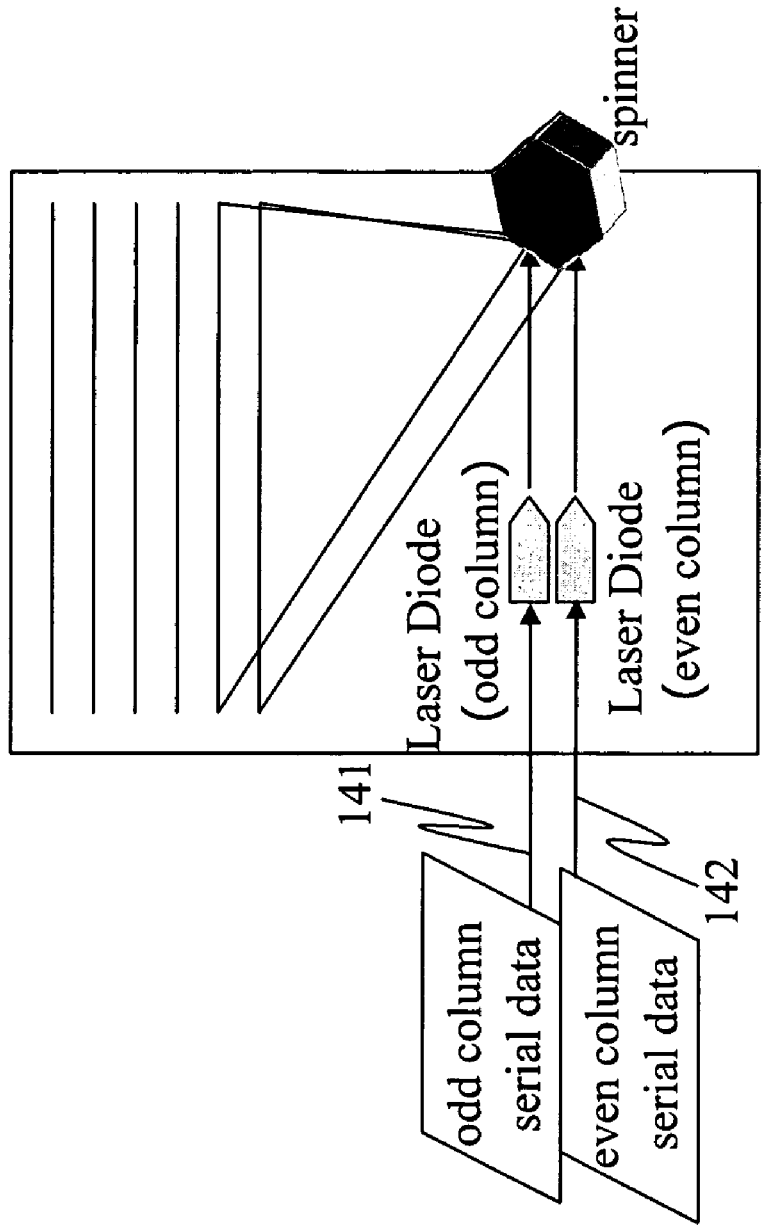
FIG. 3 is a structural schematic view of a conventional two-beam engine application.
Figure 4:
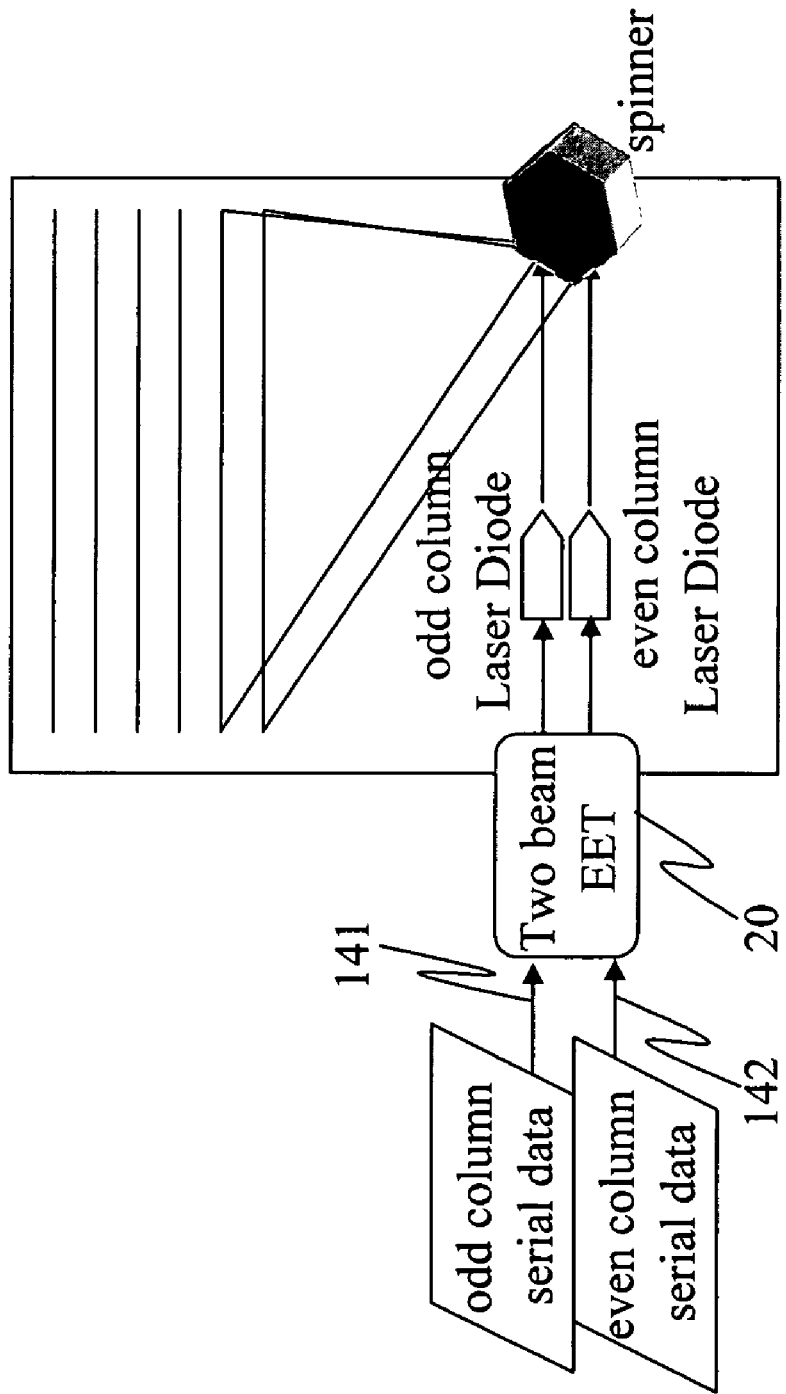
FIG. 4 is a structural schematic view of a two-beam EET according to the present invention.

Although the present invention can be extended to the application of n output pixel apparatuses, to be easily understood, two output pixel apparatuses are taken as the embodiment for illustration. Referring to FIG. 4, it is a structural schematic view of a two-beam Edge Enhancement Technology (EET) according to the present invention, wherein the first input unit 141 is used for reading the odd column of serial data, whereas the second input unit 142 is used for reading the even column of serial data; after being read, the serial data are processed by a two-beam EET 20, and then they are sent to the odd columns of Laser Diodes (LD) and even columns of LDs respectively; then two columns of serial data are output to a display apparatus or a printing apparatus through a spinner. In the present invention, two one-beam EETs 10 are also employed to carry out the two-beam EET 20, but only six first in first out (FIFO) buffers 120 and Static Random Access Memories (SRAM) 170 are required, being only half of that of the conventional art. More detailed method for processing data is shown in the following drawings.

Figure 5A:
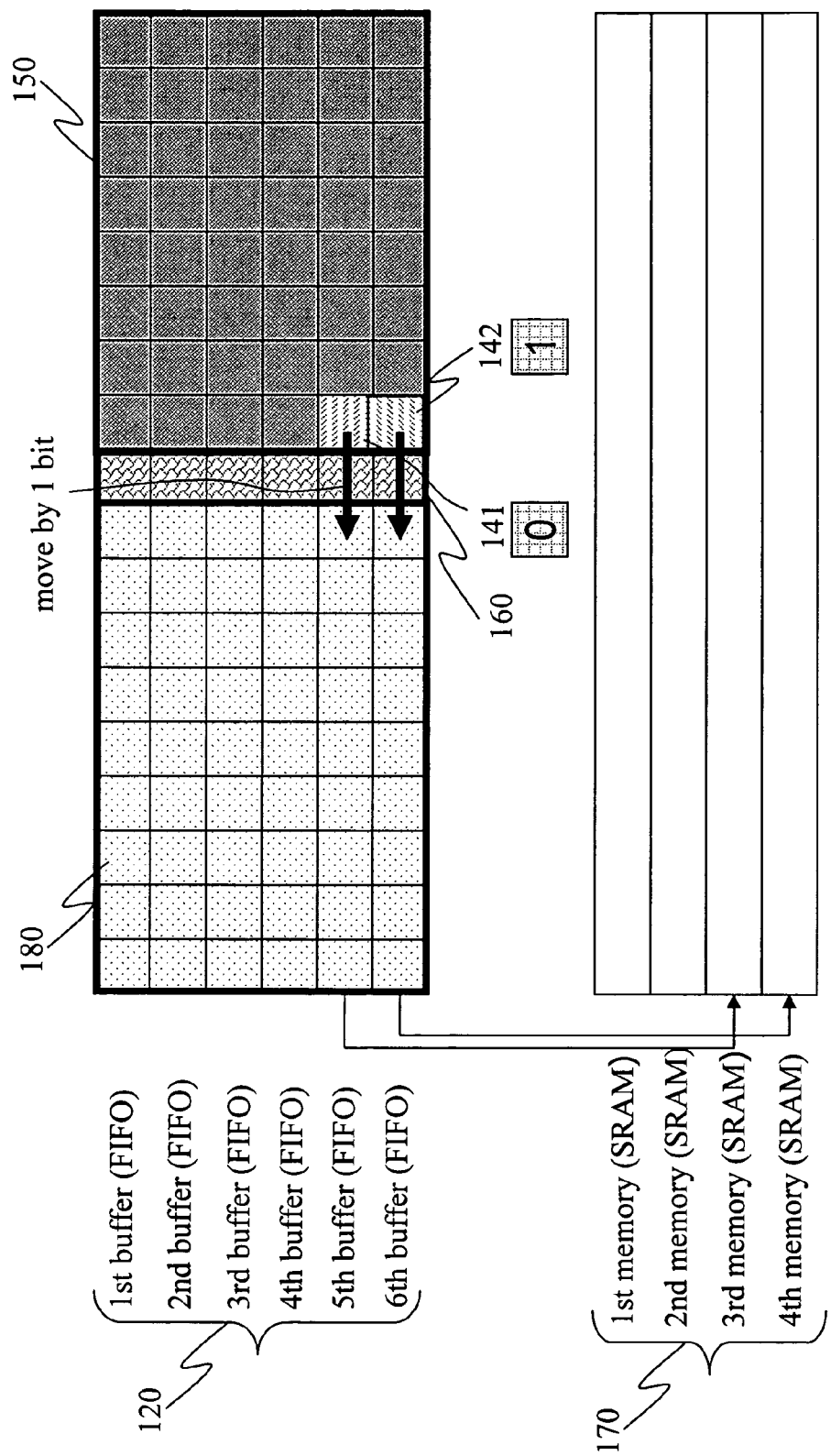
FIG. 5a to 5i is exploded schematic views of a processing flow of an embodiment of the two-beam EET according to the present invention.

Referring to FIG. 5a, at first, six buffers in a FIFO buffer 120 are turned on, wherein the FIFO buffer 120 is generally a register connected to CPU with a faster accessing speed than that of SRAM 170, but it is relatively expensive, with smaller capacity, about less than 1K bytes. The first input unit 141 reads the first bit data of the first column of serial data (assumed to be "0" in the figures), and meanwhile the second input unit 142 reads the first bit data of the second column of serial data (assumed to be "1" in the figures). After being read, the bit data are stored in the fifth buffer and the sixth buffer at the back end of a space block 160, wherein the space block 160 is used for spacing an operation block 180 with a register block 150, and in practice the space block 160 can be omitted to save the space of the register.

Figure 5B:
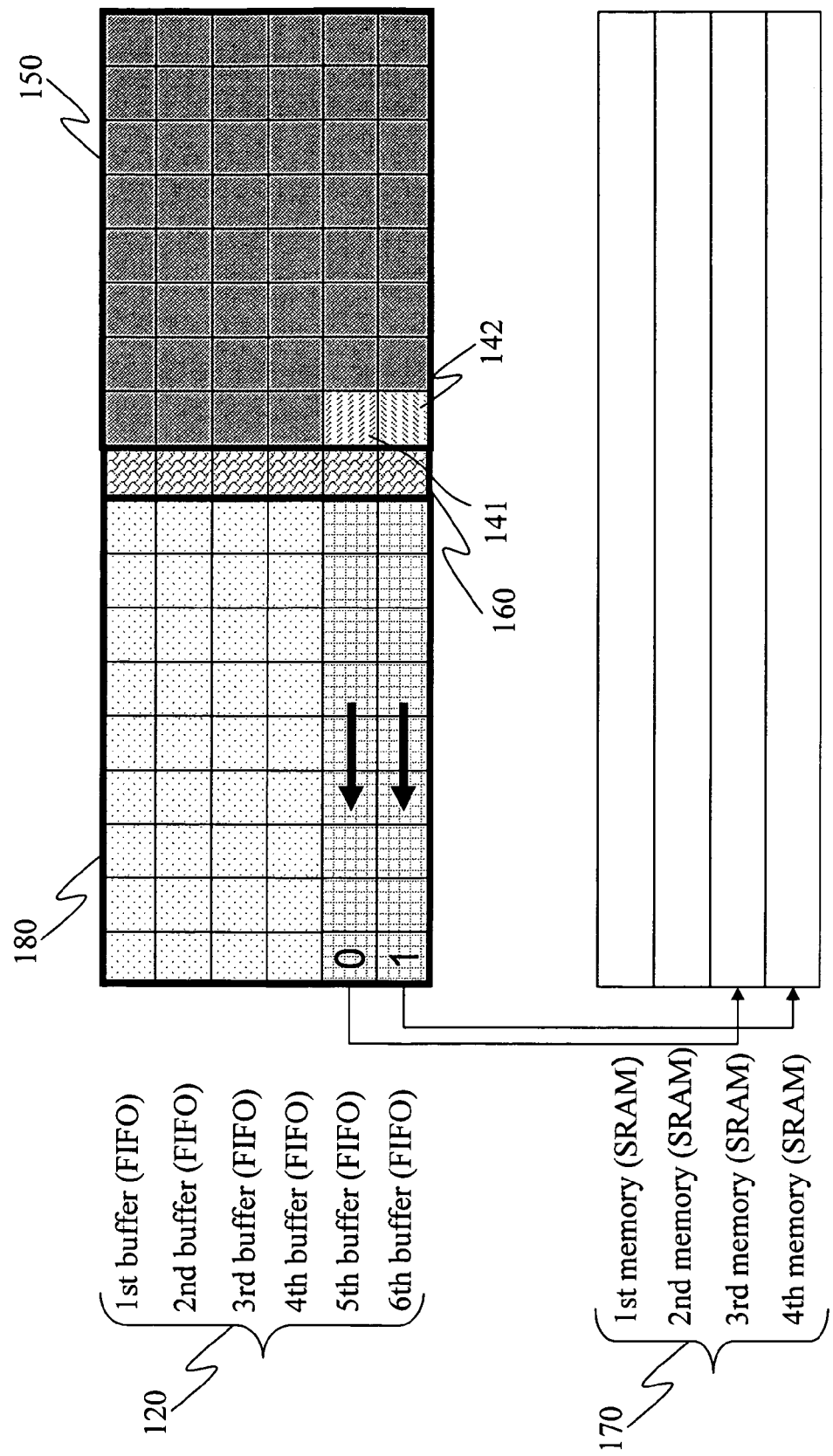

Next, the first input unit 141 continues to read the second bit data of the first column of serial data, which is also stored in the original position for storing the first bit data, while the first bit data is moved left by one bit. The same procedure is repeated on the second input unit 142. As shown in FIG. 5b, in case of the first bit data ("0") of the first column of serial data and the second bit data ("1") of the second column of serial data being moved to the first rows of the fifth buffer and the sixth buffer, when the next bit data is read, the first bit data ("0") of the first column of serial data is moved to one end of the third memory to be written, meanwhile the second bit data ("1") of the second column of serial data is also moved to the same end of the fourth memory to be written.

Figure 5C:
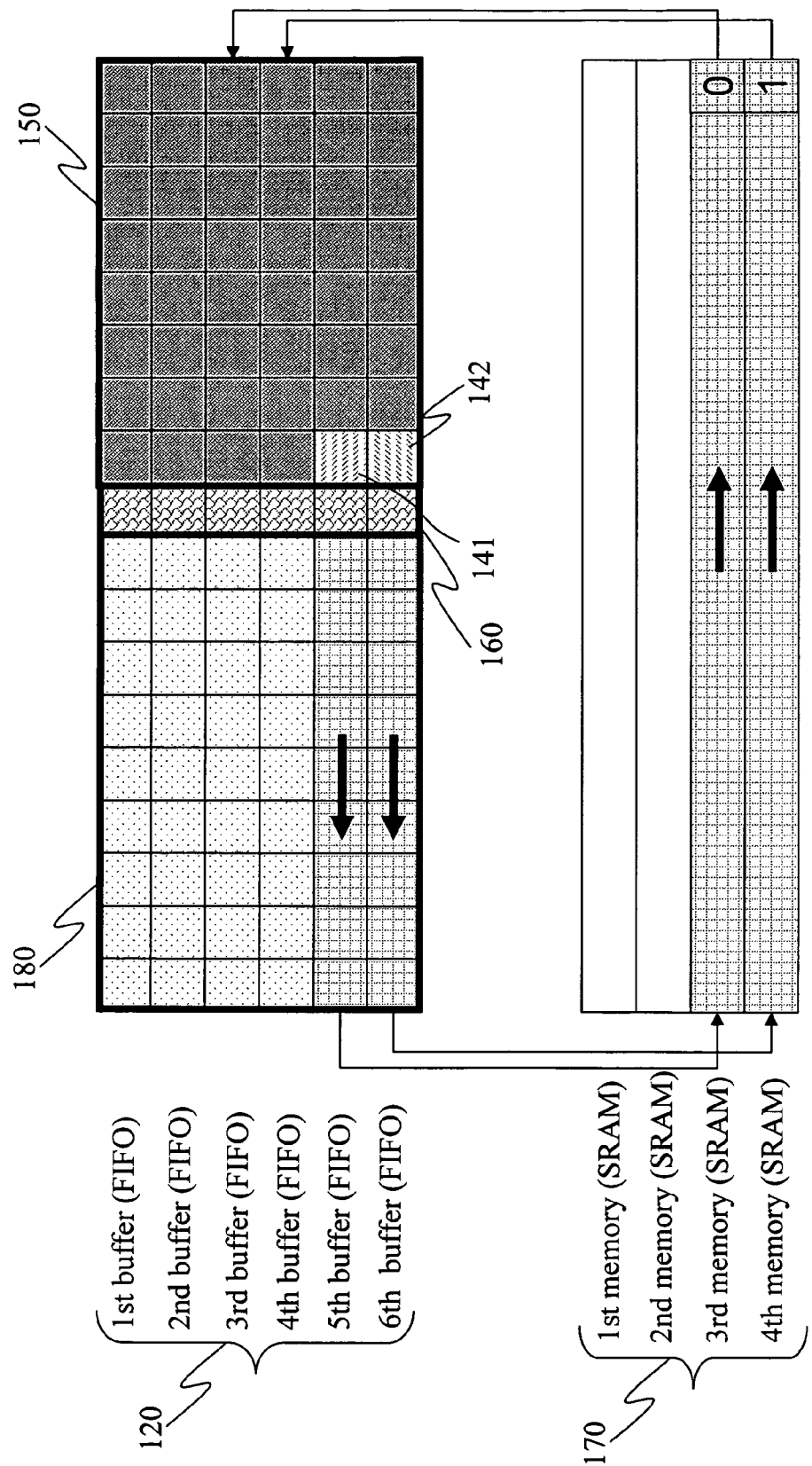
Figure 5D:
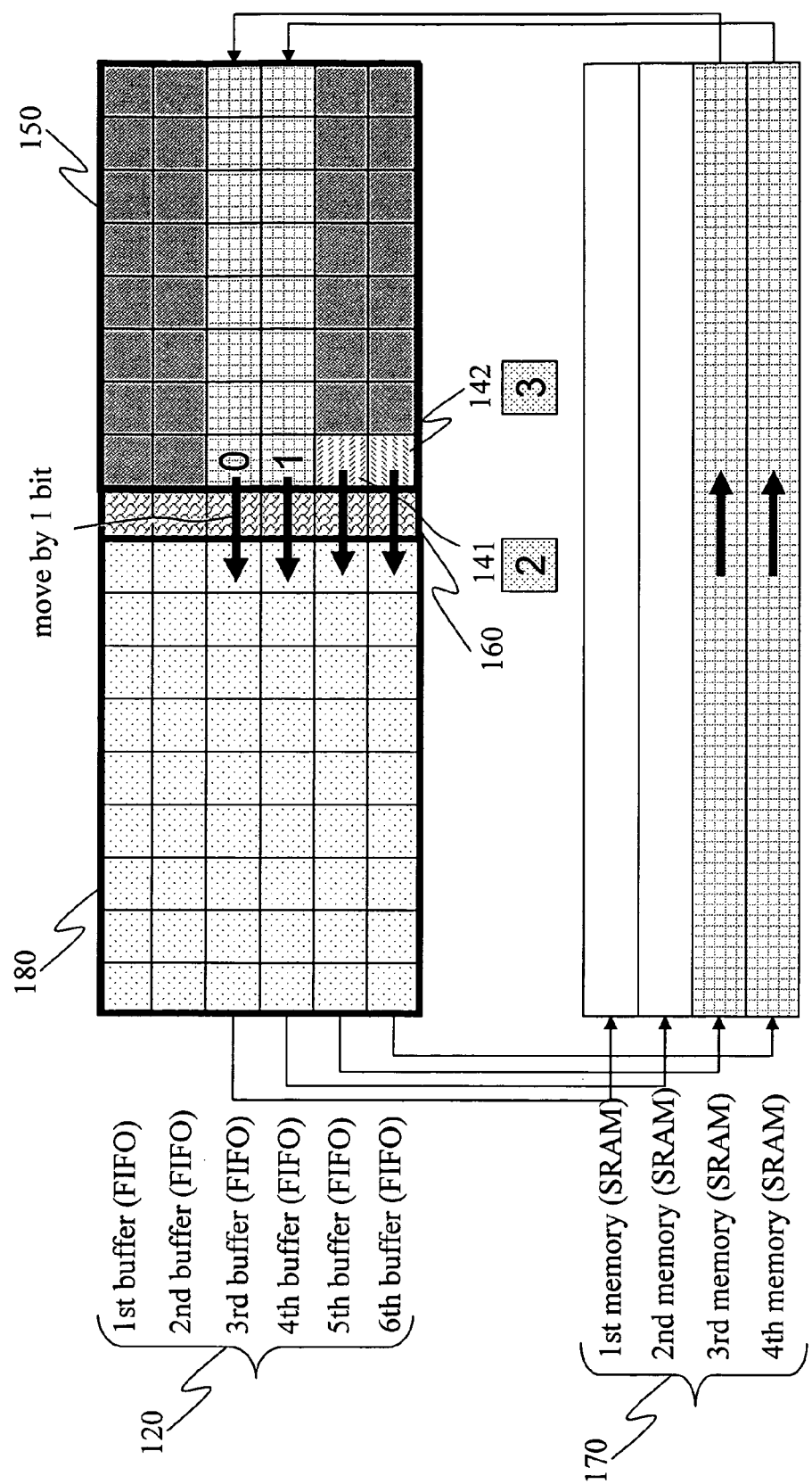

Then, the serial data are continued to be read. "0" and "1" are moved to the other ends of the third memory and the fourth memory, as shown in FIG. 5c. And then the two bit data "0" and "1" will be move to the back end of the register block 150 of the third buffer and the fourth buffer to be stored, wherein the space of the register block 150 can be set as required by the practical operation. After the first column of serial data and the second column of serial data are all read by the FIFO buffer 120 and the SRAM 170, referring to FIG. 5d, when the first bit data ("0") of the first column of serial data and the second bit data ("1") of the second column of serial data are moved to the first rows of the third buffer and the fourth buffer beginning from the back of the space block 160, the first input unit 141 reads the first bit data (assumed as "2" in the figures) of the third column of serial data, and meanwhile the second input unit 142 also reads the first bit data (assumed as "3" in the figures) of the fourth column of serial data. And then they are temporarily stored in the fifth buffer and the sixth buffer at the back end of the space block 160 by the same way of storing 0 and 1.

Figure 5E:
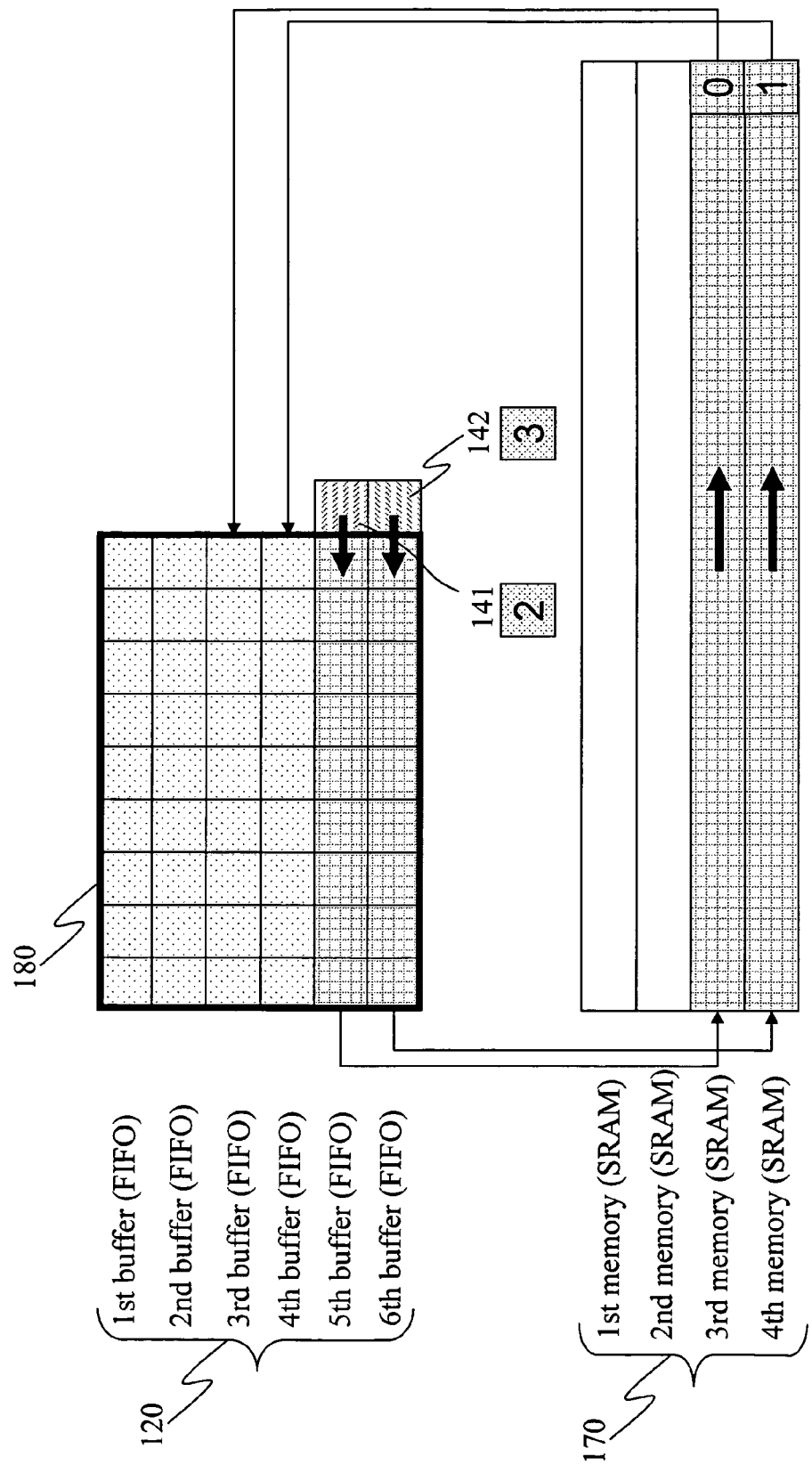

However, in practice, the space block 160 and register block 150 also can be omitted in the register, thus the space occupied by the register when carrying out the EET operation is further reduced, but correspondingly the efficiency of data processing will be much lower under the configuration without the register mechanism. It is carried out as shown in FIG. 5e, wherein when the first bit data ("0") of the first column of serial data and the second bit data ("1") of the second column of serial data are ready to be moved to the ninth row of an operation block 180 of the third buffer and the fourth buffer, the first input unit 141 and the second input unit 142 will also read the first bit data (assumed as "2" in the figures) of the third column of serial data and the first bit data (assumed as "3" in the figures) of the fourth column of serial data at the same time. "0", "1", "2", and "3" are written meanwhile in the ninth rows of the third buffer, the fourth buffer, the fifth buffer, and the sixth buffer of the operation block 120. When the first input unit 141 and the second input unit 142 continue to read the second bit data of the third column of serial data and the fourth column of serial data, the four first bit data "0", "1", "2", and "3" will be moved to the eighth row from the ninth row. Then, the second bit data of the first column of serial data, the second column of serial data, the third column of serial data, and the fourth column of serial data are written in the ninth rows of the third buffer, the fourth buffer, the fifth buffer, and the sixth buffer.

Figure 5F:
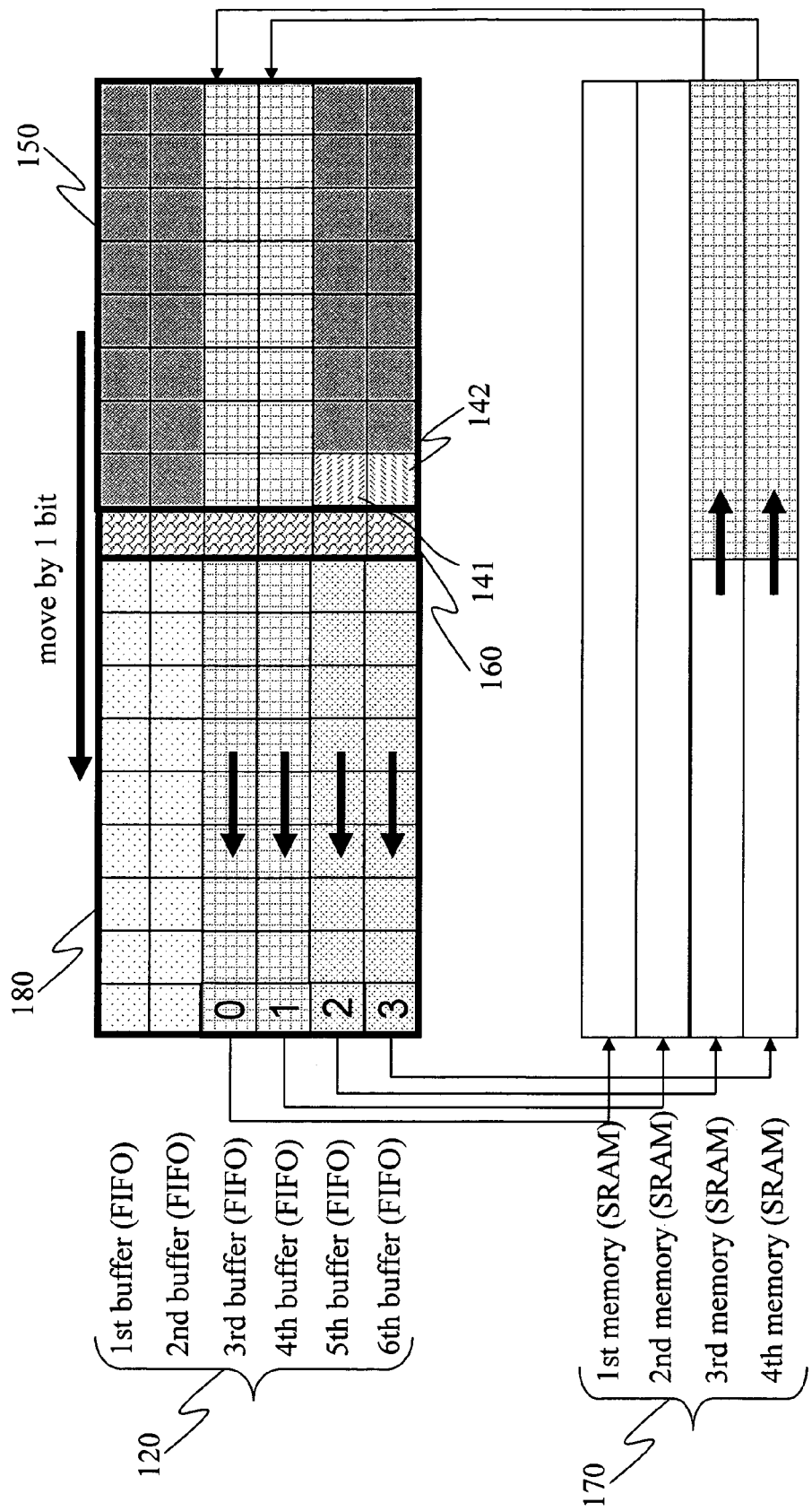

Back to the illustration of the embodiment comprising the space block 160 and the register block 150, referring to FIG. 5*f*, in case of "0", "1", "2", and "3" being moved to the first rows of the third buffer, the fourth buffer, the fifth buffer, and the sixth buffer, when the first input unit 141 and the second input unit 142 continue to read the next bit data, "0", "1", "2", and "3" are meanwhile moved to one end of the first memory, the second memory, the third memory, and the fourth memory to be written.

Figure 5G:
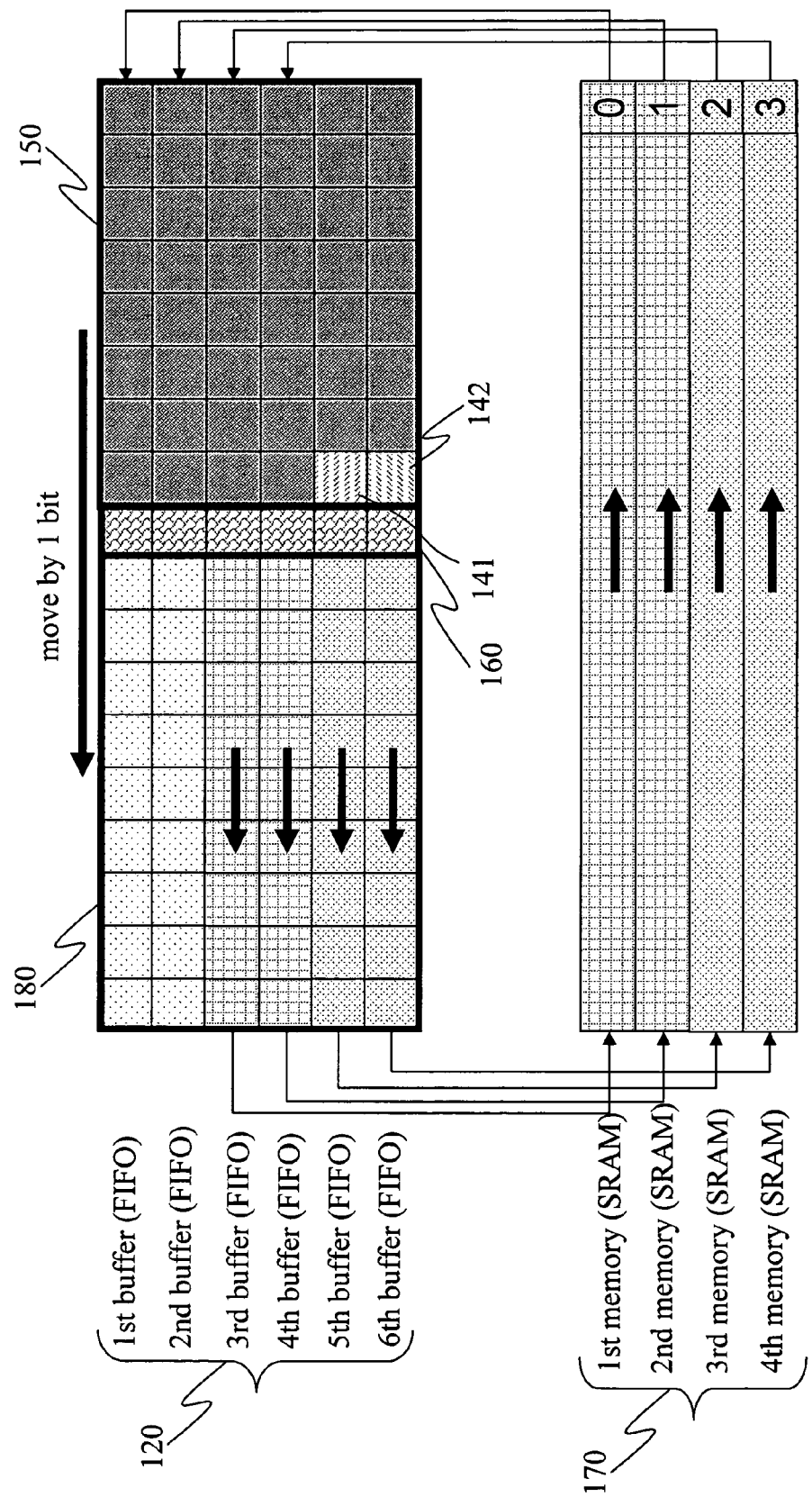
Figure 5H:
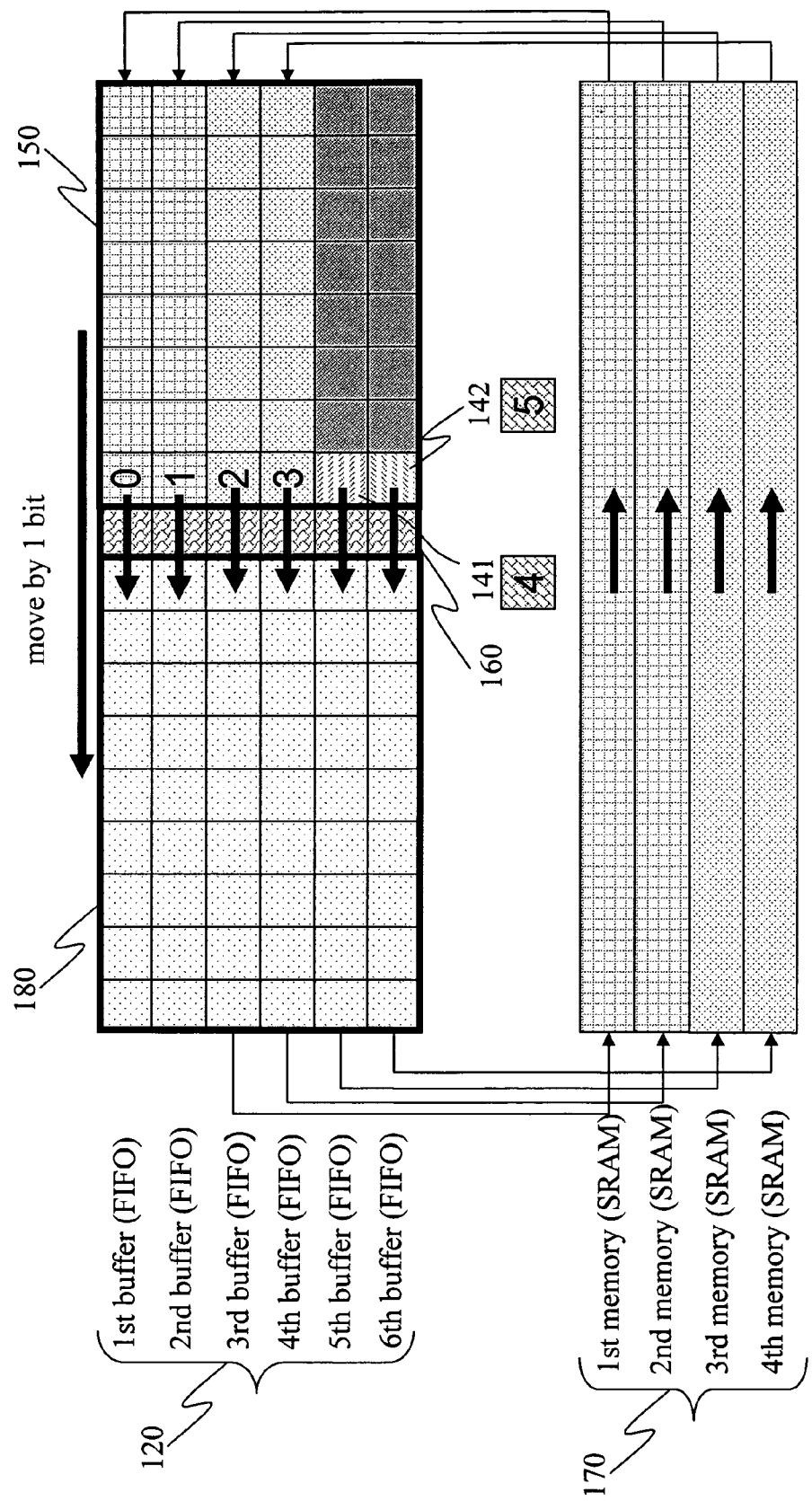

When the first column of serial data, the second column of serial data, the third column of serial data, and the fourth of column serial data completely fill the SRAM 170 according to the order of pointer, that is, "0", "1", "2", and "3" have reached the other end of the SRAM 170 due to being moved. As shown in FIG. 5*g*, "0", "1", "2", and "3" will be moved to the register block 150 of the first buffer, the second buffer, the third buffer, and the fourth buffer. After the first column of serial data, the second column of serial data, the third column of serial data, and the fourth column of serial data are all read by the FIFO buffer 120 and the SRAM 170, referring to FIG. 5*h*, at this time, "0", "1", "2", and "3" have been moved to the first row of the first buffer, the second buffer, the third buffer, and the fourth buffer beginning from the back of the space block 160. Then the first input unit 141 reads the first bit data (assumed as "4" in the figures) of the fifth column of serial data, and meanwhile the second input unit 142 also reads the first bit data (assumed as "5" in the figures) of the sixth column of serial data, and then the data are temporarily stored in the fifth buffer and the sixth buffer at the back end of the space block 160.

Figure 5I:
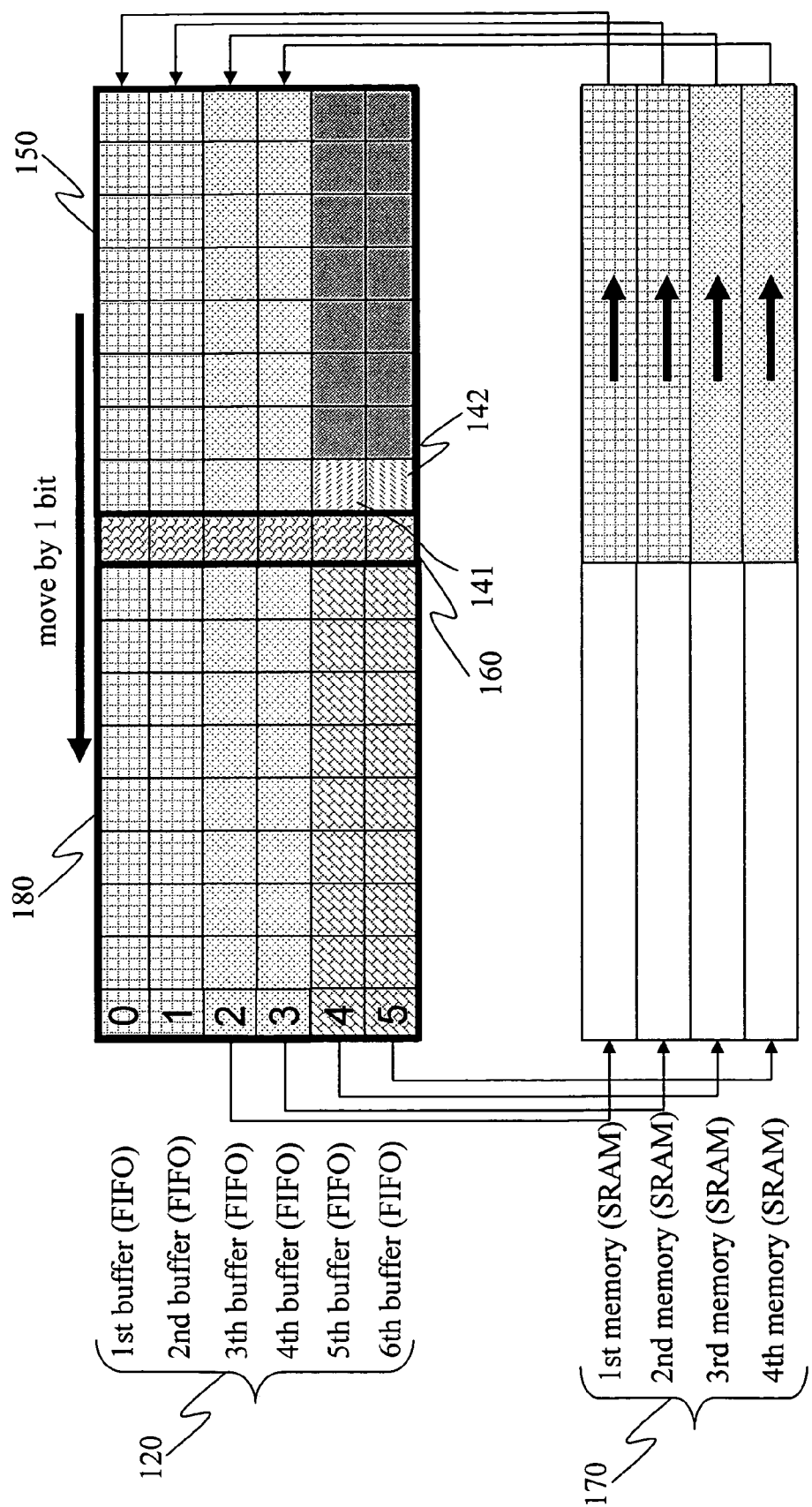

Finally, the storing result is shown in FIG. 5*i*, wherein the first buffer stores the first column of serial data, the second buffer stores the second column of serial data, the third buffer stores the third column of serial data, the fourth buffer stores the fourth column of serial data, the fifth buffer stores the fifth column of serial data, and the sixth buffer stores the sixth column of serial data, and the 9×6 blocks in the operating area 180 are fully occupied. In addition to fill the first buffer, the second buffer, the third buffer, and the fourth buffer, the first column of serial data, the second column of serial data, the third column of serial data, and the fourth column of serial data enable the individual remaining data to be stored in the first memory, the second memory, the third memory, and the fourth memory sequentially.

Figure 6:
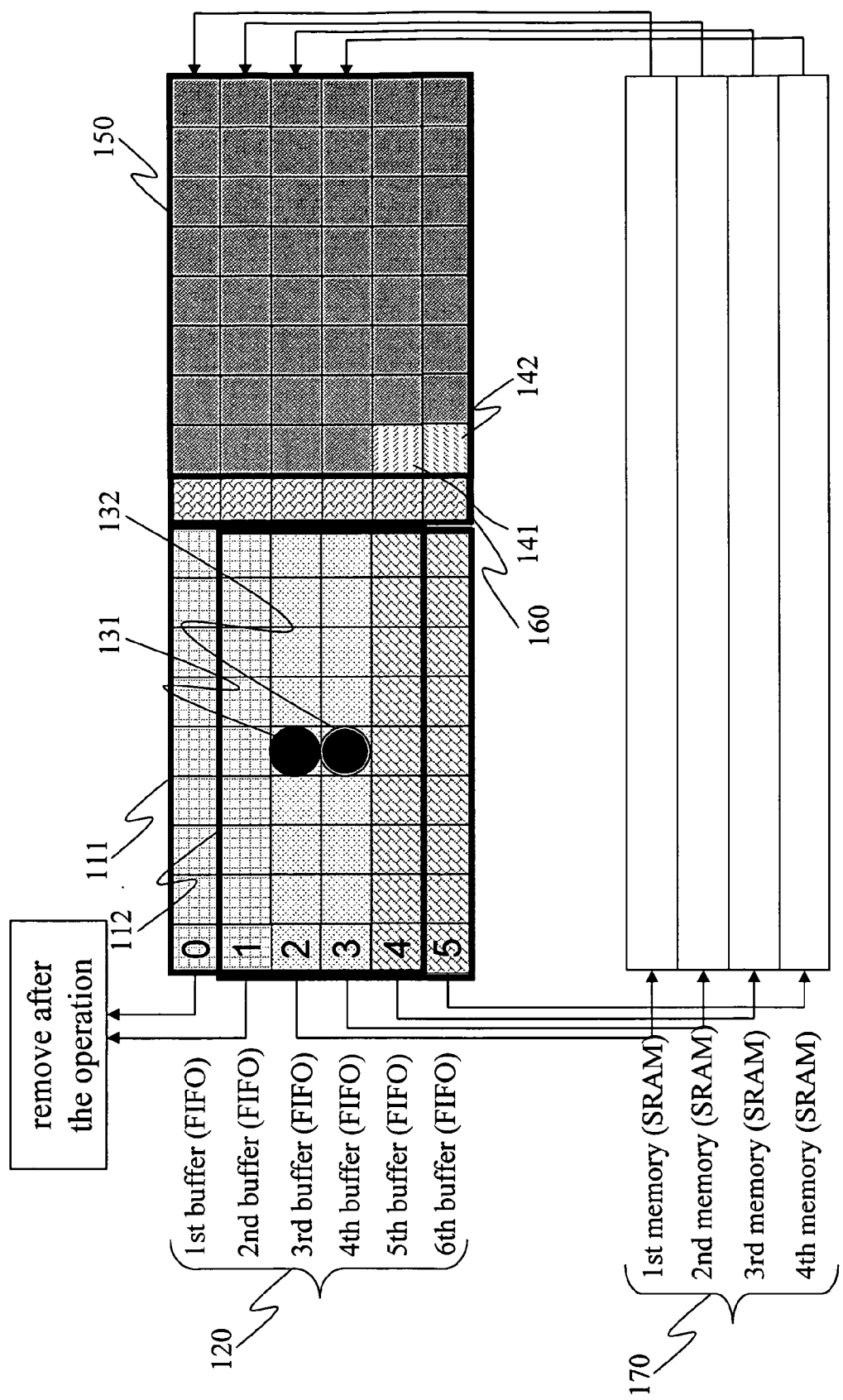
FIG. 6 is a schematic view of an embodiment of taking out a 9×5 table required by the two-beam EET according to the present invention.

Then, the 9×5 tables 110 required for calculating EET are started to be taken out, as shown in FIG. 6. The first five columns of the 9×6 blocks are taken as the first 9×5 table 111, and the first central pixel 131 (at the third column and fifth row of the 9×5 table) thereof is detected to be a To Be Adjusted Pixel (TBAP) or not, and the second column to the sixth column of the 9×6 blocks are taken as the second 9×5 table 112, and the second central pixel 132 is detected in the table to be a TBAP or not. Supposing that the first central pixel 131 is determined to be a TBAP, it is calculated and adjusted with the first 9×5 table 111 through one beam EET 10; similarly, when the second central pixel 132 is also determined to be a TBAP, it is calculated and adjusted as well with the second 9×5 table 112 through one beam EET 10. But the central pixels without being adjusted can be directly transmitted to the LD, and output to a display apparatus or a printing apparatus.

When the first column of serial data and the second column of serial data both are removed as the operation has finished, the third column of serial data and the fourth column of serial data in turn to fill the first buffer and the second buffer, and the fifth column of serial data and the sixth column of serial data both have been read by the FIFO buffer 120 and SRAM 170 as well. All the serial data can be read and processed in a similar way.

Figure 7A:
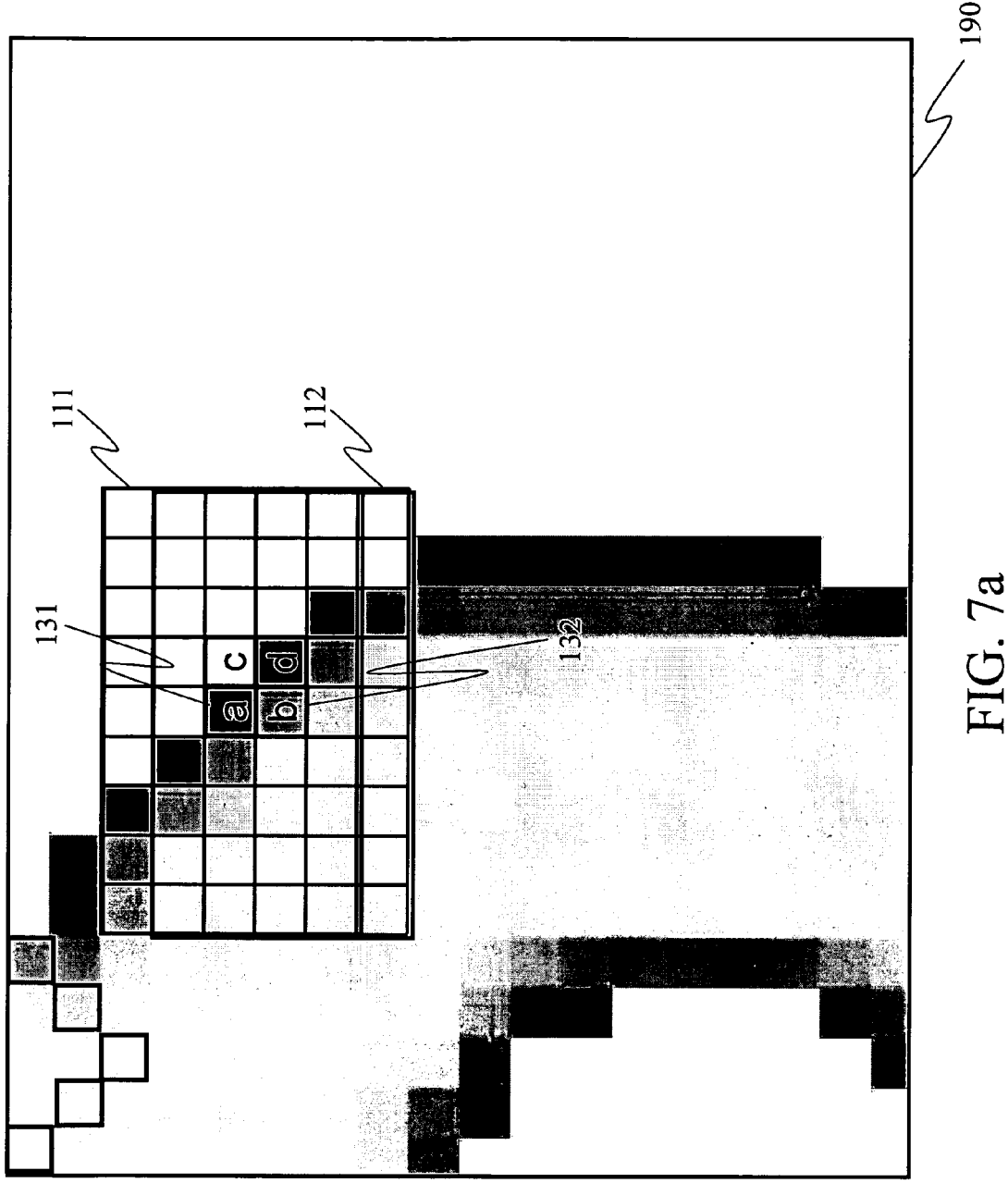
FIGS. 7a and 7b are schematic views of an embodiment of transforming from an original operation block to the next operation block in the two-beam EET according to the present invention.
Figure 7B:
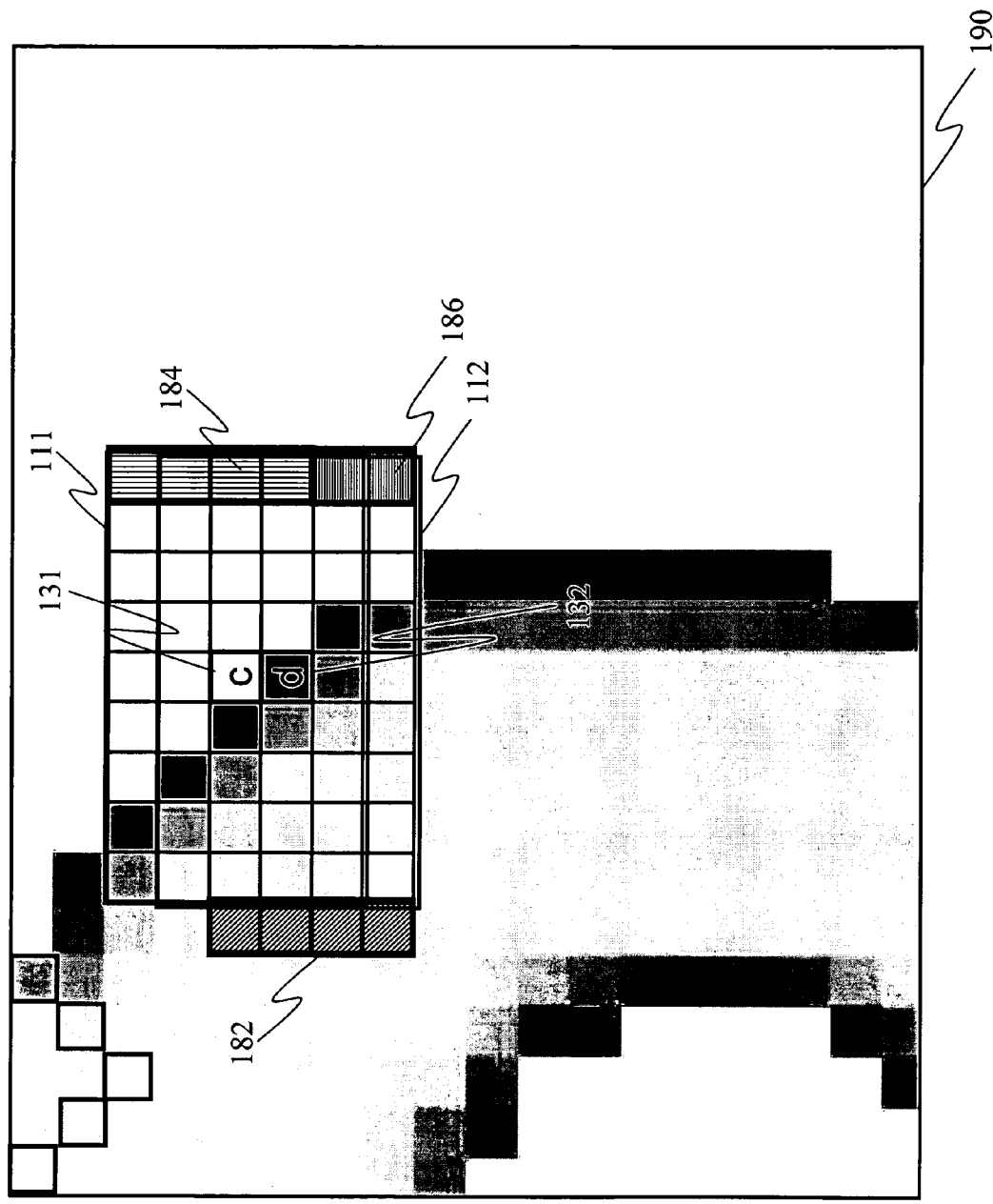

Taking another embodiment as an example for illustration, referring to FIG. 7*a*, supposing that in a digital image serial data 190, the first 4 columns of serial data have already been adjusted through the EET, and at this time, the first central pixel 131 is a bit data at the fifth column and the tenth row of the digital image serial data 190, and the second central pixel 132 is a bit data at the sixth column and the tenth row of the digital image serial data 190. The Edge Enhancement operation is carried out to the 9×5 tables 111, 112 with the two TBAPs as the central pixels respectively, to obtain the adjusted pixel values, and then to output the obtained values. Then, referring to FIG. 7*b*, the two bit data to be removed after operation at the third column and the sixth row and at the fourth column and the sixth row are removed from the FIFO buffer 120, while the remaining four bit data 182 in the same row are stored in one end of the SRAM 170. The next bit data of the first 4 columns are captured from the other end of the SRAM 170 to be filled in the end 184 of the first 4 buffers, while the next bit data read by the first read unit 141 and the second read unit 142 are stored at the end 186 of the fifth and sixth buffers. Therefore, it can be seen clearly from the figure that, the first central pixel 131 has replaced a with c, whereas the second central pixel 132 will also replace b with d, and the bit data in the two 9×5 tables 111, 112 are moved towards left by one bit, which is equivalent to the two 9×5 tables 111, 112 being moved towards right by one bit with the next bit data of a and b as the center, and detected and adjusted through Edge Enhancement.

Figure 8:
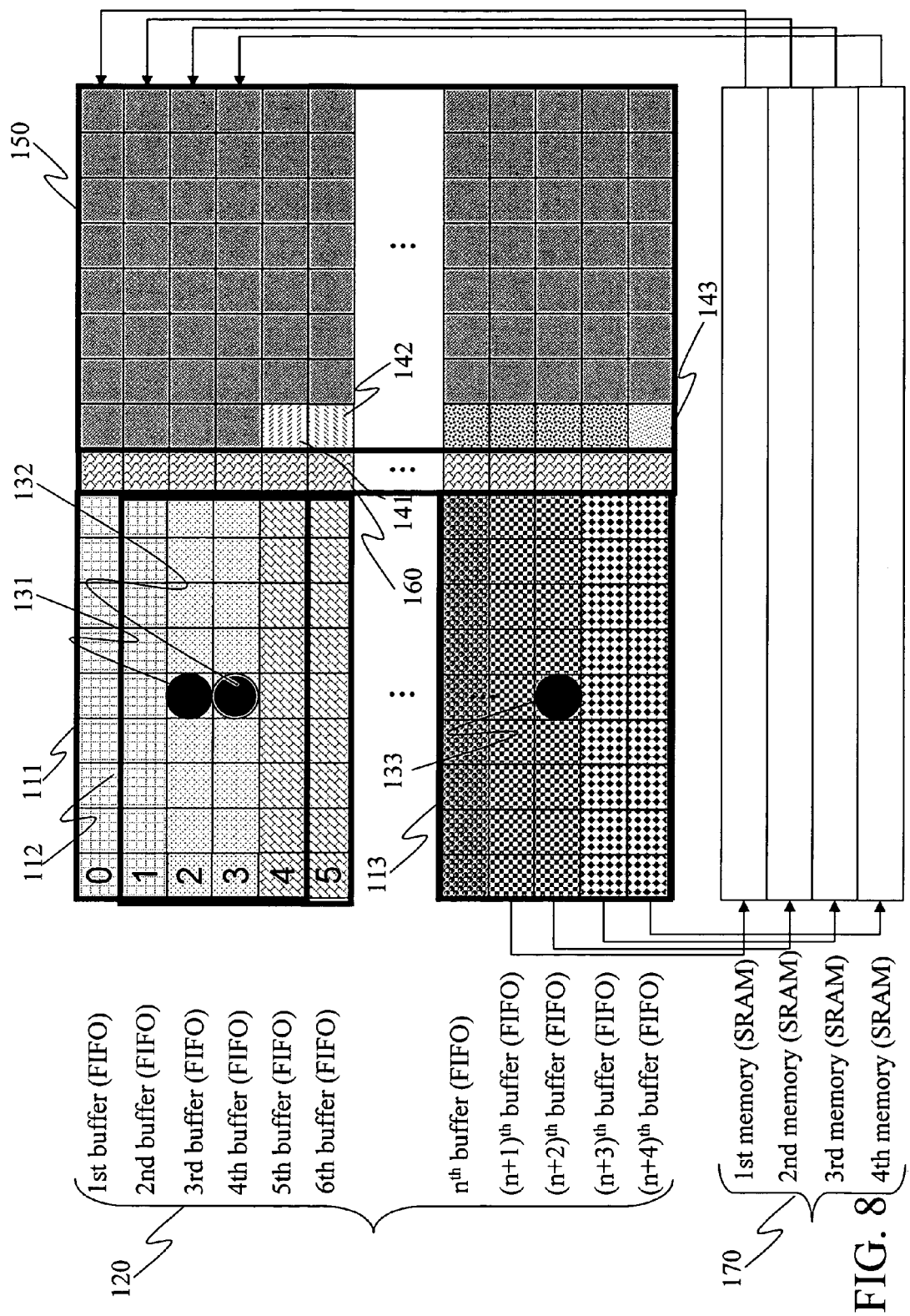
FIG. 8 is a schematic view of carrying out Edge Enhancement with the multiple beam pixel apparatus according to the present invention.
Figure 9:
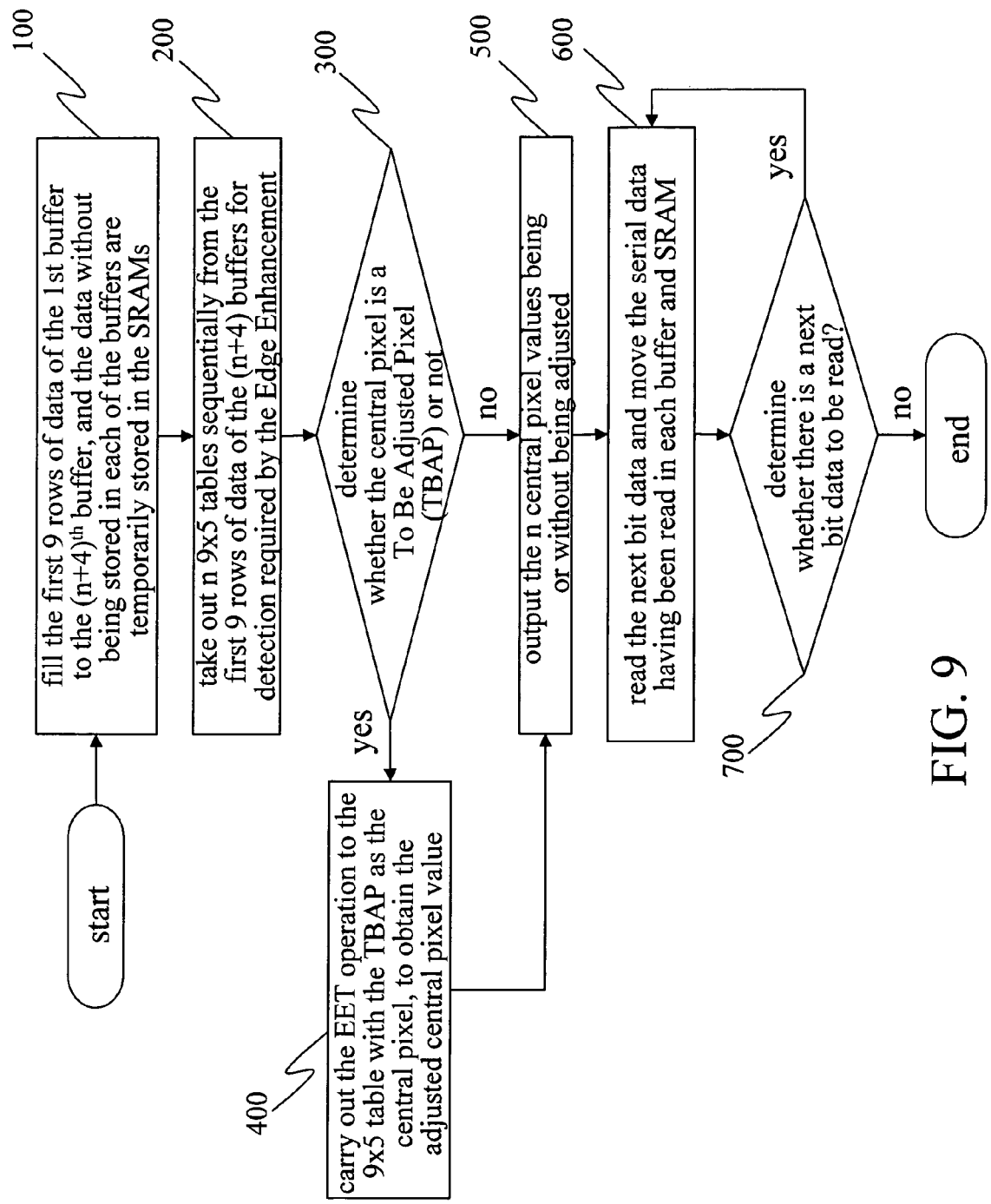
FIG. 9 is a flow chart of a method of the present invention.
Figure 10:
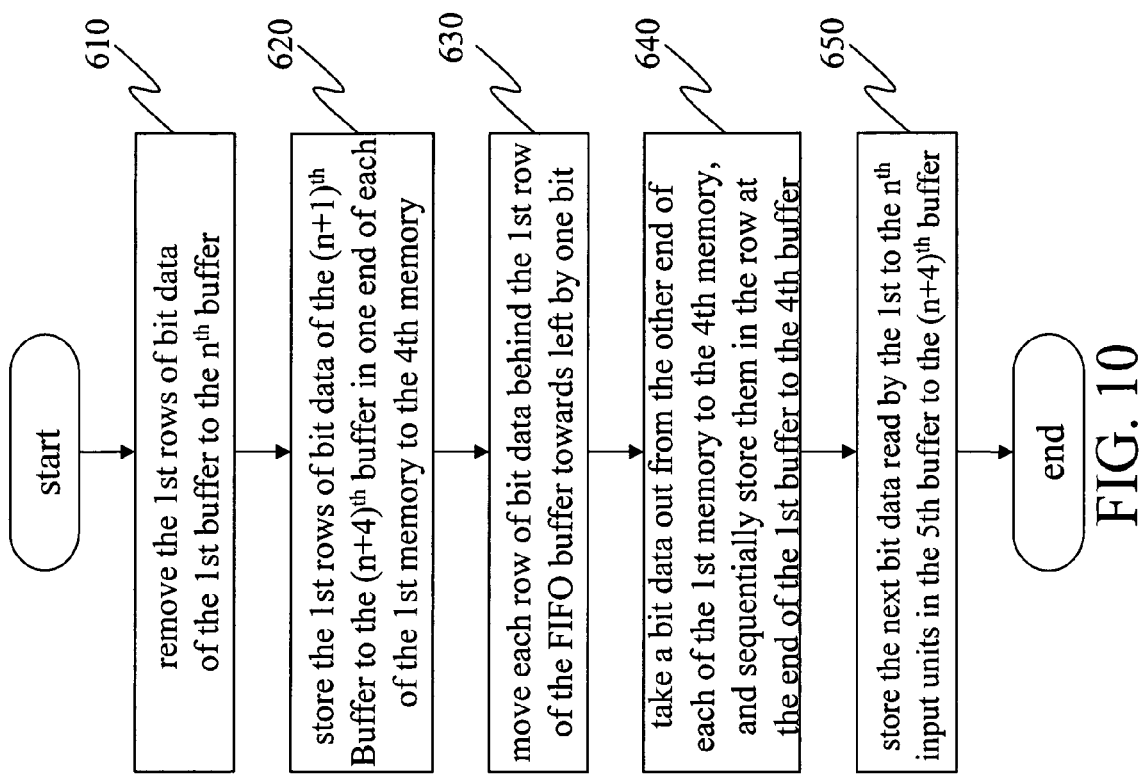
FIG. 10 is a flow chart of a method for transforming from an original operation block to the next operation block according to the present invention.

Referring to FIG. 8, it is a schematic view of carrying out Edge Enhancement through extending the present invention to the multiple beam pixel apparatus. And referring to FIG. 9, it is a flow chart of the method of the present invention. First, the first column of serial data is read by the first input unit 141, and the second column of serial data is read by the second input unit 142, and similarly, the $n^{th}$ column of serial data is read by the $n^{th}$ input unit 143. The first 9 rows of data of the first buffer to the $(n+4)^{th}$ buffer are filled according to the order of each column of the serial data, and those data in the first 4 columns of serial data without being stored in each of the buffers are temporarily stored in the SRAM 170 (step 100). Then, meanwhile n 9×5 tables 111, 112, . . . , 113 are taken out from the (n+4) buffers sequentially (step 200), for determining whether the central pixel 131, 132, . . . , 133 of each table is a To Be Adjusted Pixel (TBAP) or not (step 300). If it is a TBAP, EET operation is carried out to the 9×5 table with the TBAP as the central pixel, to obtain the adjusted central pixel value (step 400). Then, the n central pixel values, being or without being adjusted, are output (step 500). Then the next bit data of the first n columns of serial data are read by each input unit 141, 142, ..., 143, and the read serial data in each buffer and SRAM 170 are moved (step 600), the details are shown in FIG. 10. When the first input unit 141 to the $n^{th}$ input unit 143 continues to read the next bit data, the first rows of bit data of the first buffer to the $n^{th}$ buffer are removed (step 610). And the first rows of bit data of the $(n+1)^{th}$ buffer to the $(n+4)^{th}$ buffer are stored in one end of each of the first memory to the fourth memory (step 620). Each row of bit data behind the first row of the FIFO buffer 120 is moved towards left by one bit (step 630). And a bit data is taken out from the other end of each of the 4 SRAMs 170, and they are sequentially stored in the row at the end of the first buffer to the fourth buffer (step 640). The next bit data read by the first input unit 141 to the $n^{th}$ input unit 143 are stored in the fifth buffer to the $(n+4)^{th}$ buffer (step 650). Finally, the central pixel value of each of the 9×5 tables 111, 112, ..., 113 is detected and adjusted according to the above steps, until there is no next bit data to be output (step 700).

In summary, with the method disclosed in the present invention, each bit data of the serial data to be processed by the Edge Enhancement will only be read once by all the input units, thus there is no waste of bandwidths for external output/input, and excessive processing resources of the central process unit (CPU) are not additionally required to read the external data and the waiting time is not needed as well. And with the method of the present invention, the demanding of FIFO buffer 120 and SRAM 170 in the system will not increase by multiple times as there are more and more input units 140 or a plurality of pixel outputs, and it will be controlled within a range increased by a constant. Therefore, the larger the number of the input units is, the more significantly the internal resource consumption is reduced. And when reading n bit data, n pixels processed by the EET can be output meanwhile, so long as the operation capacity of the CPU is strong enough.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reducing memory consumption when carrying out Edge Enhancement in a multiple beam pixel apparatus, applied to a multiple beam pixel apparatus with n input units, the apparatus being provided with (n+4) buffers and four static random access memories (SRAM), and the first nine rows of the (n+4) buffers being an operation block; the method comprising the following steps:

filling the operation block with serial data sequentially, wherein as for the first four columns of serial data in the operation block, since the first four buffers are all fully occupied, the serial data without being stored in each of the buffers are temporarily stored in the four SRAMs;

taking out n 9 by 5 tables for detecting required by the Edge Enhancement according to the arranging order of each of the buffers in the operation block;

carrying out the edge enhancement technology (EET) adjustment operation to the central pixels required to be edge enhanced in the n 9 by 5 tables;

outputting the n central pixel values being adjusted or with no need of being adjusted;

moving the serial data having already been read by the (n+4) buffers and the four SRAMs; and reading the next bit data with each of the n input units, wherein n is an integer and is larger than 1.

2. The method for reducing memory consumption when carrying out Edge Enhancement in a multiple beam pixel apparatus according to claim 1, wherein each of the buffers further comprises a register block, for storing part of the serial data read by the n input units.

3. The method for reducing memory consumption when carrying out Edge Enhancement in a multiple beam pixel apparatus according to claim 2, wherein the register block is further used for storing the serial data transferred from the four SRAMs due to moving.

4. The method for reducing memory consumption when carrying out Edge Enhancement in a multiple beam pixel apparatus according to claim 2, wherein each of the buffers further comprises a space block, for spacing the data of the register block with the data of the operation block.

5. The method for reducing memory consumption when carrying out Edge Enhancement in a multiple beam pixel apparatus according to claim 1, wherein each of the buffers is a first in first out (FIFO) buffer.

6. The method for reducing memory consumption when carrying out Edge Enhancement in a multiple beam pixel apparatus according to claim 1, wherein the central pixel is the pixel at the third column and the fifth row of the 9 by 5 table.

7. The method for reducing memory consumption when carrying out Edge Enhancement in a multiple beam pixel apparatus according to claim 1, wherein the first column of the $n^{th}$ 9 by 5 table is the first nine rows of serial data of the $n^{th}$ buffer, and the fifth column of the $n^{th}$ 9 by 5 table is the first nine rows of serial data of the $(n+4)^{th}$ buffer.

8. The method for reducing memory consumption when carrying out Edge Enhancement in a multiple beam pixel apparatus according to claim 1, wherein moving the serial data having already been read by the (n+4) buffers and the four SRAMs further comprises the following steps:

removing the first rows of bit data of the first buffer to the $n^{th}$ buffer;

storing the first rows of bit data of the $(n+1)^{th}$ buffer to the $(n+4)^{th}$ buffer in one end of each of the four SRAMs;

moving each row of bit data behind the first rows of the first buffer to the $(n+4)^{th}$ buffer towards left by one bit;

taking out a bit data from the other end of each of the four SRAMs, and storing them sequentially in the row at the end of the first buffer to the fourth buffer; and storing the next bit data read by the first input unit to the $n^{th}$ input unit to the row at the end of the fifth buffer to the $(n+4)^{th}$ buffer sequentially.

9. A method for generating a next table by moving serial data, suitable for sequentially generating n 9 by 5 tables for carrying out the EET operation when the first nine rows of the first buffer to the $(n+4)^{th}$ buffer are all filled with the serial data and the four SRAM have stored the serial data without being stored in each of the buffers, the method comprising the following steps:

removing the first rows of bit data of the first buffer to the $n^{th}$ buffer;

storing the first rows of bit data of the $(n+1)^{th}$ buffer to the $(n+4)^{th}$ buffer in one end of each of the four SRAMs;

moving each row of bit data behind the first rows of the first buffer to the $(n+4)^{th}$ buffer towards left by one bit;

taking out a bit data from the other end of each of the four SRAMs, and storing them sequentially in the row at the end of the first buffer to the fourth buffer; and storing the next bit data read by the first input unit to the $n^{th}$ input unit to the row at the end of the fifth buffer to the $(n+4)^{th}$ buffer sequentially, wherein n is an integer and is larger than 1.

10. The method for generating a next table by moving serial data according to claim 9, wherein the first column of the $n^{th}$ 9 by 5 table is the first nine rows of serial data of the $n^{th}$ buffer, and the fifth column of the $n^{th}$ 9 by 5 table is the first nine rows of serial data of the $(n+4)^{th}$ buffer.

* * * * *